(12) United States Patent
Nissen et al.

(10) Patent No.: US 11,338,892 B2
(45) Date of Patent: May 24, 2022

(54) AUTONOMOUS SEABASED RESUPPLY SYSTEM

(71) Applicant: Bell Textron Inc., Fort Worth, TX (US)

(72) Inventors: Jeffrey Paul Nissen, Alba, TX (US); Troy Cyril Schank, Keller, TX (US); Peter Charles Robichaux, Mary Ester, FL (US); Jason Paul Hurst, Fort Worth, TX (US); Todd Christopher Worden, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/683,521

(22) Filed: Nov. 14, 2019

(65) Prior Publication Data

US 2021/0147043 A1 May 20, 2021

(51) Int. Cl.
| | | |
|---|---|---|
| *B63G 8/00* | (2006.01) | |
| *B63B 35/50* | (2006.01) | |
| *B64F 1/28* | (2006.01) | |
| *B63B 35/00* | (2020.01) | |
| *B64C 29/00* | (2006.01) | |

(52) U.S. Cl.
CPC .......... *B63B 35/50* (2013.01); *B63B 35/003* (2013.01); *B63G 8/001* (2013.01); *B64F 1/28* (2013.01); *B63G 2008/005* (2013.01); *B64C 29/0033* (2013.01)

(58) Field of Classification Search
CPC ...... B63G 8/22; B63G 2008/004; B63G 8/39; B63B 35/50; B63B 35/53; B63B 2035/007; B63B 35/285; B63B 35/003; B64D 39/00; B64F 1/28
See application file for complete search history.

(56) References Cited

U.S. PATENT DOCUMENTS

| | | | | |
|---|---|---|---|---|
| 1,828,655 A | * | 10/1931 | Emil | B63G 8/001 114/262 |
| 3,626,880 A | * | 12/1971 | Schwartz | B63G 8/22 114/333 |
| 3,848,558 A | * | 11/1974 | Henry | B63G 11/00 114/313 |
| 4,007,700 A | | 2/1977 | Haynes et al. | |
| 4,327,784 A | | 5/1982 | Denniston | |
| 5,445,093 A | * | 8/1995 | Lilly, Jr. | B63B 27/24 114/256 |
| 6,604,711 B1 | | 8/2003 | Stevens et al. | |
| 6,644,594 B1 | | 11/2003 | Hunn et al. | |
| 6,945,187 B1 | * | 9/2005 | Woodall | B63B 35/285 114/244 |
| 7,793,888 B2 | | 9/2010 | Padan | |
| 7,887,010 B2 | | 2/2011 | Takacs et al. | |
| 8,991,447 B1 | * | 3/2015 | Petersen | B67D 9/00 141/387 |
| 9,540,169 B1 | | 1/2017 | Krohn | |
| 9,919,807 B2 | * | 3/2018 | Henderson | B64D 37/06 |

(Continued)

*Primary Examiner* — Andrew Polay
(74) *Attorney, Agent, or Firm* — Shackelford, Bowen, McKinley & Norton, LLP

(57) ABSTRACT

An exemplary autonomous seabased resupply system includes an unmanned blob positioned in a water body, the blob containing fuel, a pump on the blob configured to pump the fuel through a conduit to a craft, and a ballast system operable to change a vertical position of the blob in the water body.

20 Claims, 6 Drawing Sheets

(56) References Cited

U.S. PATENT DOCUMENTS

| | | |
|---|---|---|
| 10,065,717 B1* | 9/2018 | Husain .................... B63G 8/001 |
| 10,137,998 B2 | 11/2018 | Margetis |
| 10,363,858 B1 | 7/2019 | Woodall |
| 2009/0090286 A1* | 4/2009 | Korolenko ............... B63G 8/30 |
| | | 114/5 |
| 2014/0059979 A1* | 3/2014 | Szydlowski ............ B63B 25/12 |
| | | 53/467 |
| 2016/0090160 A1* | 3/2016 | Nakagawa ............... B63G 8/04 |
| | | 114/331 |
| 2018/0044033 A1* | 2/2018 | Margetis ................ B64D 39/06 |
| 2019/0144090 A1* | 5/2019 | Schmidt ................. B63B 35/44 |
| | | 114/339 |

* cited by examiner

AUTONOMOUS SEABASED RESUPPLY SYSTEM

BACKGROUND

This section provides background information to facilitate a better understanding of the various aspects of the disclosure. It should be understood that the statements in this section of this document are to be read in this light, and not as admissions of prior art.

Aircraft range is limited by fuel consumption and on-board fuel capacity. Limited aircraft range is of particular import with regard to over-water flights. Helicopters and vertical takeoff and landing aircraft often have flight paths that extend from land-based airfields to at sea locations and sea-to-sea locations. For example, in commercial applications, aircraft such as helicopters are commonly used to transport supplies and personnel to offshore (fresh or salt water) drilling rigs and to transport passengers to and from watercraft for medical emergencies. These operations are significantly limited by aircraft range. Similarly, the range of military vertical and takeoff landing aircraft is limited by the fuel consumption and the ability to access fuel and weapons.

SUMMARY

An exemplary seabased resupply system includes a blob configured to hold fuel and a pump on the blob configured to pump the fuel through a conduit to a craft. An exemplary autonomous seabased resupply system includes an unmanned blob positioned in a water body, the blob containing fuel, a pump on the blob configured to pump the fuel through a conduit to a craft, and a ballast system operable to change a vertical position of the blob in the water body. An exemplary method for resupplying a craft at sea includes deploying an unmanned blob containing fuel in a water body and transferring the fuel to a craft.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
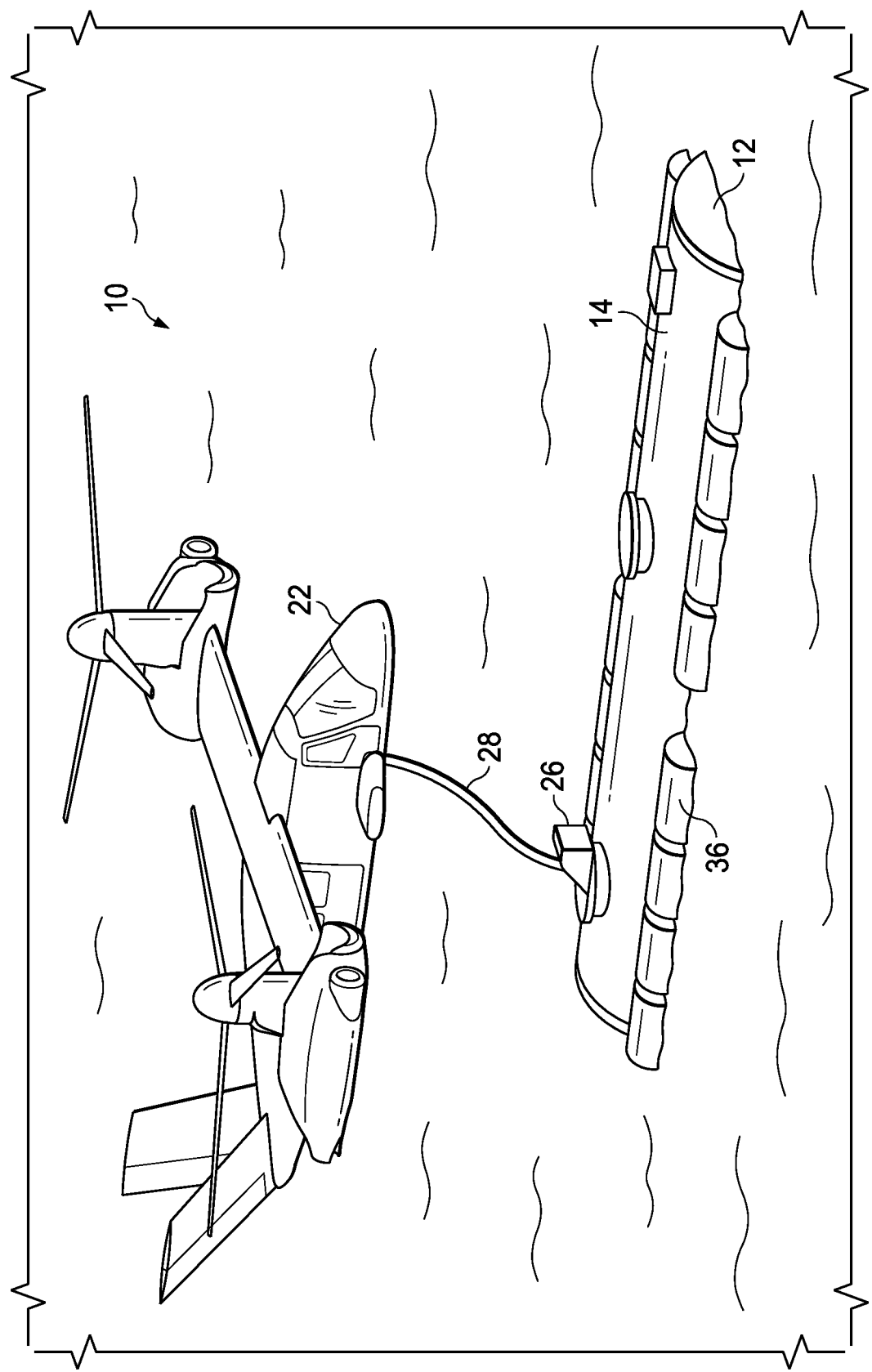
FIG. 1 illustrates an exemplary autonomous seabased resupply system refueling a hovering aircraft.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIGS. 1-8 illustrate exemplary autonomous seabased resupply systems, generally denoted by the numeral 10. System 10 is configured to resupply, for example refuel and or rearm, aircraft and or watercraft at sea. System 10 includes a blob 12 that is deployed at sea to serve as a platform to resupply the aircraft. System 10 is an autonomous system in that blob 12 is deployed without a human on-board. Blob 12 may be deployed at sea 5 for example by airdrop from an aircraft such as a C-130, towed by a watercraft, and in some instances self-propelled. Blob 12 may be configured to be selectively submersible so that it can be hidden from view and or located a sufficient distance below water surface 7 to avoid watercraft traffic or marine life. System 10 may include a sensing system to identify hazards such as sea traffic, heavy seas, and marine life, in particular cetaceans. The sensing system may be in communication with a controller and propulsion and or ballast system to actively avoid the hazards. System 10 may be deployed at sea to supply a planned flight or may be strategically deployed for activation, e.g., raised to the surface, at a later unspecified date. Blob 12 may be anchored for station keeping. As will be understood by those skilled in the art with benefit of this disclosure, autonomous sea-based supply system 10 can be used to resupply watercraft in addition to aircraft.

Blob 12 is a structure that may be constructed of a rigid or flexible material such as metal, plastic, fiberglass or other material suitable for deployment in water. In an exemplary embodiment, blob 12 is a flexible liquid fuel containment membrane. Blob 12 is illustrated as having a cylindrical shape, however, it is not limited to a particular shape. Blob 12 is configured once deployed in the water to settle in a position having a top surface 14 from which resupply operations are performed and bottom surface 16. For example, bottom surface 16 may have a greater weight than the top surface and or a fluid that is lighter than water, e.g., air, fuel, may be contained proximate top surface 14. In the resupply position, shown in FIGS. 1, 2, 7, and 8, top surface 14 is located above water surface 7. Blob 12 may include a keel 18 located on bottom surface 16 to provide pitch stability. Blob 12 may be configured in the resupply position, with top surface 14 above the water line, to have a center of gravity 20 positioned below water surface 7 to provide pitch stability. System 10 may have an active stability augmentation system, for example using a movable (rotating or translating) mass to counter wave motion. An exemplary active stability augmentation system is available under United States trademark, SEAKEEPER.

Figure 2:
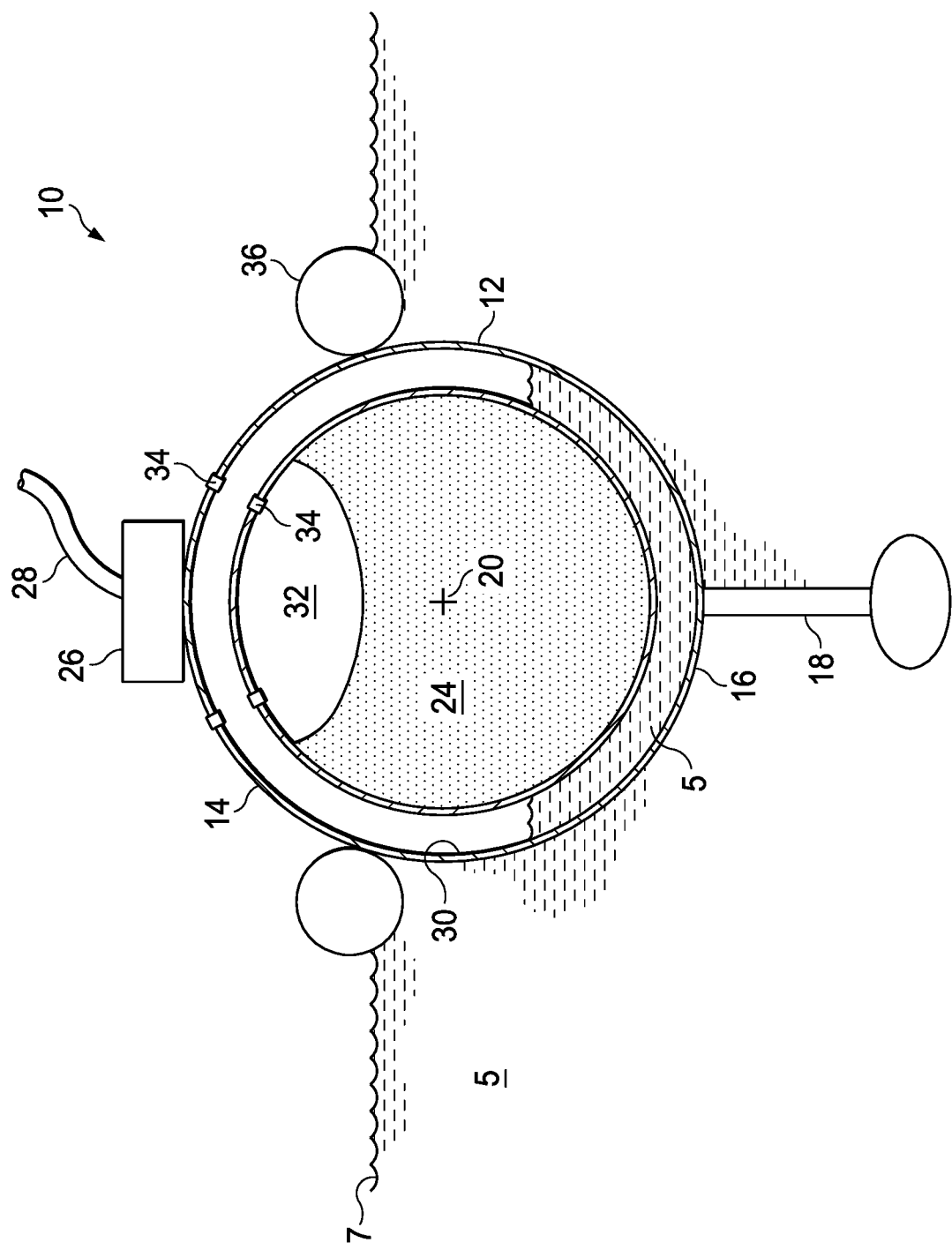
FIG. 2 illustrates an exemplary autonomous seabased resupply system configured to resupply a hovering aircraft or a watercraft.

Referring in particular to FIGS. 1 and 2, an exemplary autonomous resupply system 10 is illustrated in a watercraft and aerial-only resupply configuration. In this example, system 10 is configured to resupply a watercraft or a hovering aircraft 22 and does not have surface area on top surface 14 to land an aircraft. Aircraft 22 may be a helicopter or vertical takeoff and landing (VTOL) aircraft. Blob 12 is illustrated in a resupply position with top surface 14 positioned above water surface 7. In this example, blob 12 contains aviation fuel 24 and a pump 26 to transfer fuel 24 from blob 12 to aircraft 22 via a conduit 28. As will be understood by those skilled in the art with benefit of this disclosure, conduit 28 may be a rigid or flexible conduit that may be deployed from blob 12 and fluidicly coupled to aircraft 22 or deployed from aircraft 22 and coupled to blob 12. Examples of conduit 28 include, without limitation, a robotic boom deployed conduit 28, a drogue deployed conduit, a winch recovered conduit, an aircraft deployed conduit, and a pneumatically launched conduit. Blob 12 may include an additional transfer system to transfer solid materials, such as and without limitation weapons. The solids transfer system may include for example a robotic arm. Solid materials, or supplies, are non-liquid materials and liquids contained in a solid container.

Blob 12, illustrated in FIG. 2, is submersible and includes a ballast system. The ballast system may include, for example, a water chamber 30, air chamber 32, and valves 34 fluidicly connecting water chamber 30 to air chamber 32 and the atmosphere. Water chamber 30 can be filled with water 5 to fully or partially submerge blob 12. For example, the ballast system may be operated to lower blob 12 relative to water surface 7 during resupply operations.

Blob 12 may include one or more containers 36 located on the exterior of blob 12. One or more operating systems may be located inside of blob 12 and or container(s) 36. Operating systems may include control processors, liquid transfer systems, solid materials transfer systems, a ballast system, a propulsion system, power source, and a communication system for communicating with remote locations including aircraft 22. One or more containers 36 may be located on the exterior of blob 12 between top surface 14 and bottom surface 16 and provide stability to blob 12 when in the resupply position.

Figure 3:
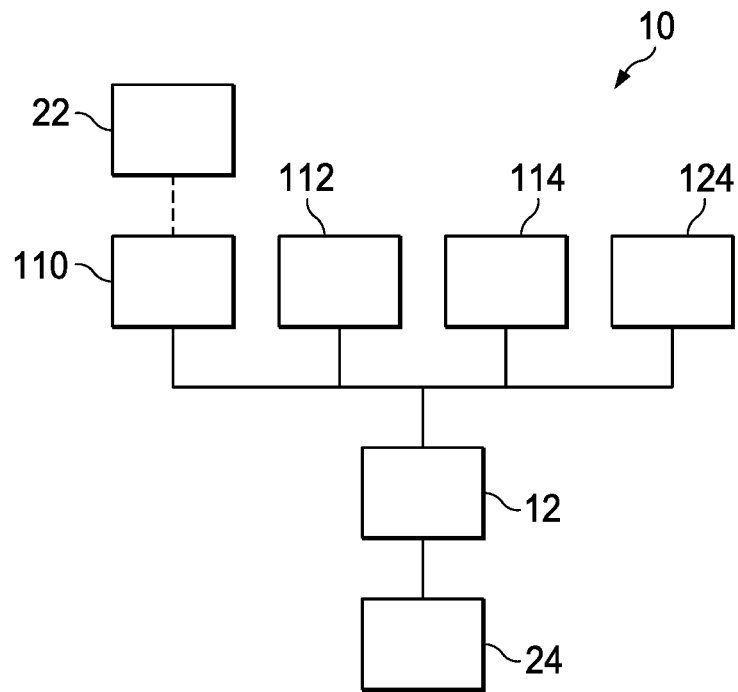
FIGS. 3-6 schematically illustrates exemplary autonomous seabased resupply systems.

FIG. 3 schematically illustrates an exemplary autonomous seabased resupply system 10. System 10 includes a blob 12 containing aviation fuel 24, a fuel transfer system 110 and electronic controller 112 in communication with fuel transfer system 110. The operating systems may be driven by electricity, electric motors, hydraulic motors, and or combustion engines. System 10 may include one or more power sources 114 located with blob 12 to power the operating systems. Power source(s) 114 may include an electric storage, e.g., battery, that may be charged by a combustion engine, motion harvesting systems (e.g., wave and current), water and or solar cells. Fuel transfer system 110 may include a pump to transfer fuel 24 to aircraft 22. Aircraft 22 may hover during resupply and in some embodiments may be landed on blob 12. In some embodiments, fuel transfer system may include fuel cells or batteries that can be transferred to hovering or landed aircraft 22 via a solid material transfer system, e.g., robotic arm, or manually by aircraft personnel. Blob 12 may include a stability augmentation system generally denoted by the numeral 124. Stability augmentation system 124 may be a computer-controlled position and motion limiting electro-mechanical device.

Figure 4:
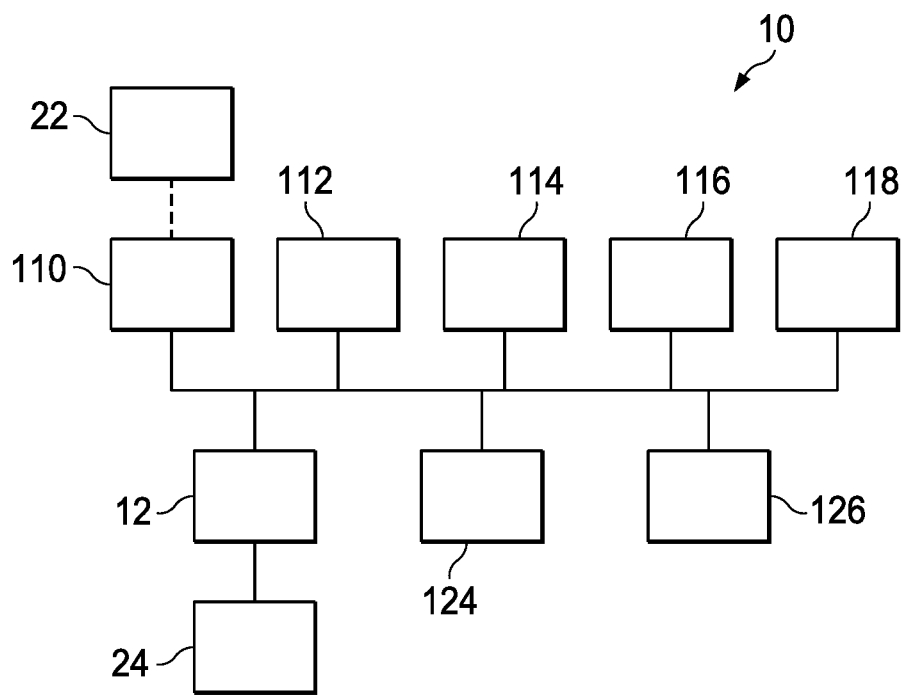

FIG. 4 schematically illustrates another exemplary autonomous seabased resupply system 10. Similar to FIG. 3, system 10 includes a blob 12 containing aviation fuel 24, a fuel transfer system 110, an electronic controller 112 in communication with fuel transfer system 110, and a power source 114. System 10 in FIG. 4 further includes one or more of a ballast system 116 and a propulsion system 118. Ballast system 116 facilitates submerging blob 12 and surfacing blob 12 for resupply operations. Propulsion system 118 may include propellers and or water jets and may be used to transport blob 12 from one location to another, maintain blob 12 in a particular location, and or to stabilize blob 12 during resupply operations to aid in coupling aircraft 22 and or landing aircraft 22 on blob 12. Blob 12 may include a stability augmentation system 124. In an exemplary embodiment, blob 12 includes a hazard sensing system 126. Hazard sensing system 126 includes sensors configured to detect for example watercraft traffic, proximity of marine life, such as cetaceans, and sea conditions (e.g., wave conditions). Hazard sensing system 126 may be coupled to electronic controller 122 and or one or both of ballast system 116 and propulsion system 118. When a hazardous condition is sensed, ballast system 116 and or propulsion system 118 may be activated to attempt to eliminate or mitigate damage to blob 12 due to the hazardous condition.

Figure 5:
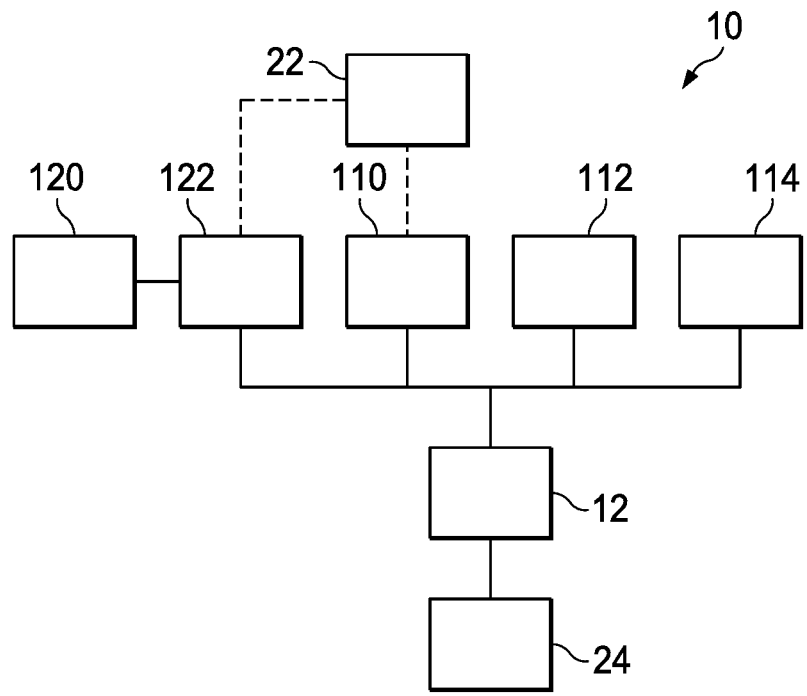

FIG. 5 schematically illustrates another exemplary autonomous seabased resupply system 10 configured to transfer solid-supplies, non-pumped materials, to an aircraft 10. For example, system 10 may be configured for military use as a forward arming and refueling point (FARP). In this configuration, blob 12 carries solid-supplies 120, e.g., contained water, food, and weapons, and a solid-material transfer system 122, also referred to as a weapon transfer system. Solid-material transfer system 122 may include for example a robotic arm to move solid-supplies 120 from blob 12 to aircraft 22. Blob 12 may also include aviation fuel 24, a fuel transfer system 110, and electronic controller 112 in communication with fuel transfer system 110 and solid-material transfer system 122, and a power source 114. As will be understood by those skilled in the art with benefit of this disclosure, aircraft 22 may be resupplied while hovering proximate to blob 12 or with aircraft 22 landed on blob 12. As will be understood by those skilled in the art with benefit of this disclosure, system 10 may include only one transfer system. For example, system 10 may include a solid-material transfer system and not include a liquid transfer, i.e., pump system. The solid-material transfer system may transfer fuel contained in containers from blob 12 to aircraft 22. System 10 may include one or both of a stability augmentation system and a hazard sensing system.

Figure 6:
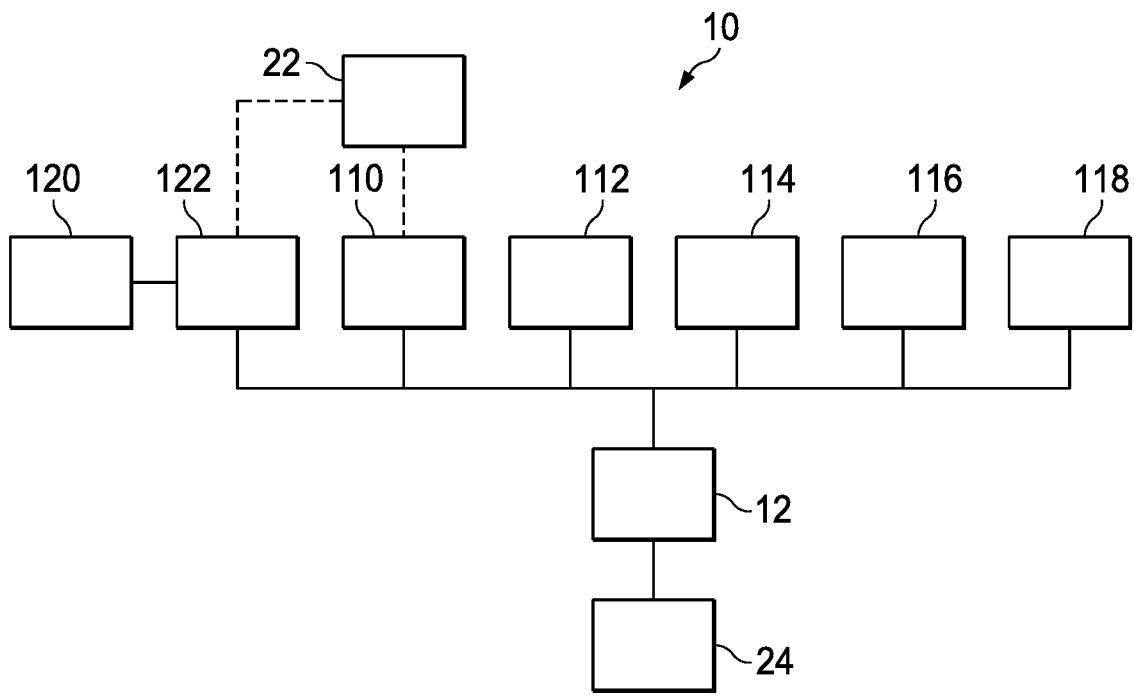

FIG. 6 schematically illustrates another exemplary autonomous seabased resupply system 10. In this configuration, blob 12 carries supplies 120 and a solid-material, non-pumped material, transfer system 122. Transfer system 122 may include for example a robotic arm to move solid-supplies 120 from blob 12 to aircraft 22. Blob 12 may also include aviation fuel 24, a fuel transfer system 110 and electronic controller 112 in communication with fuel transfer system 110 and solid-material transfer system 122, and a power source 114. As will be understood by those skilled in the art with benefit of this disclosure, aircraft 22 may be resupplied while hovering proximate to blob 12 or with aircraft 22 landed on blob 12. System 10 also includes one or more of a ballast system 116 and a propulsion system 118. Ballast system 116 facilitates submerging blob 12 and surfacing blob 12 for resupply operations. Propulsion system 118 may include propellers and or water jets and may be used to transport blob 12 from one location to another, maintain blob 12 in a particular location, and or to stabilize blob 12 during resupply operations and or landing aircraft 22 on blob 12. System 10 may include one or both of a stability augmentation system and a hazard sensing system.

Figure 7:
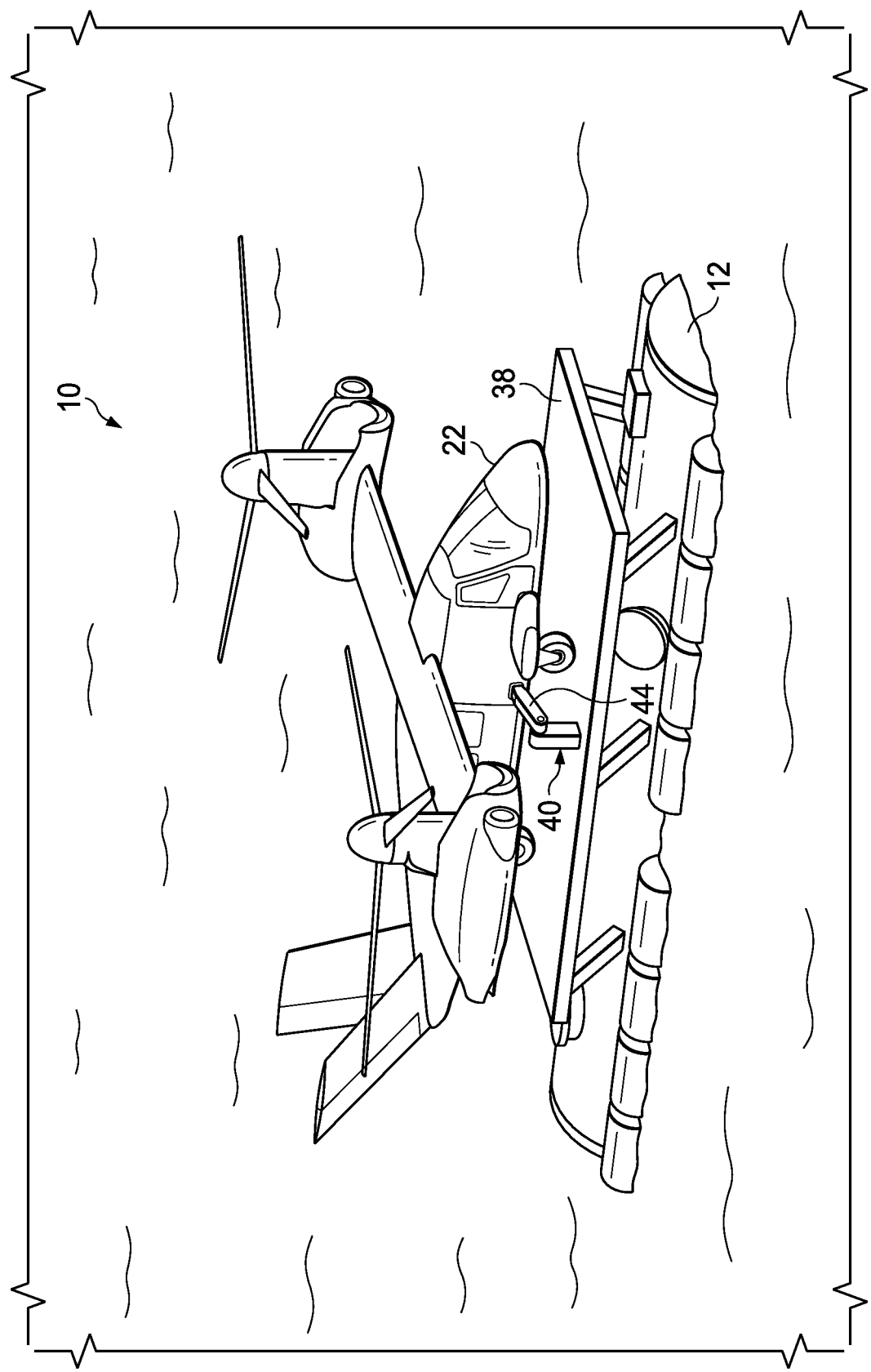
FIG. 7 illustrates an exemplary autonomous seabased resupply system resupplying a landed aircraft.
Figure 8:
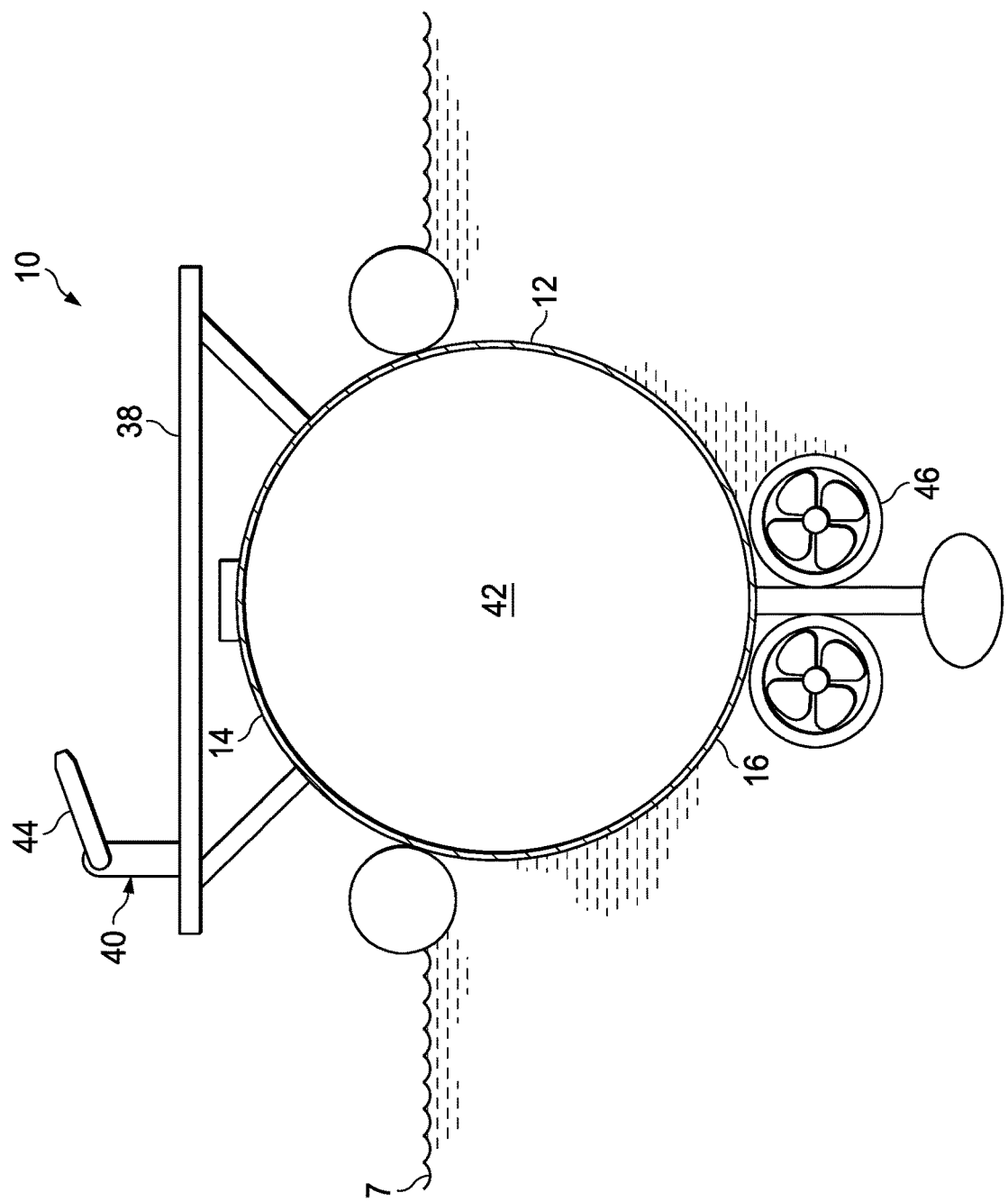
FIG. 8 illustrates an exemplary autonomous seabased resupply system configured for landing an aircraft.

FIGS. 7 and 8 illustrate an exemplary autonomous sea-based resupply system 10 configured for landing an aircraft 22 thereon. Blob 12 includes a landing pad 38 located on top surface 14 to support aircraft 22. Aircraft 22 is a vertical takeoff and landing aircraft and landing pad 38 does not include a runway. Blob 12 includes a transfer system 40 to transfer supplies 42 from blob 12 to aircraft 22. Transfer system 40 may be configured to transfer liquid supplies 42 by pumping or otherwise transfer supplies, such as weapons, liquids in containers, food, and medical equipment to aircraft 22. For example, transfer system 40 includes a boom 44 that can transport solid-supplies, including fuel contained in fuel cells, and or carry a conduit to pump liquid supplies. In this example, blob 12 includes a propulsion system 46. Blob 12 may have a ballast system as described with reference to FIGS. 2, 4, and 6.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for resupplying an aircraft at sea, the method comprising:
    deploying, in a water body, an unmanned resupply system comprising a flexible liquid fuel containment membrane containing fuel, a pump on the flexible liquid fuel containment membrane operable to pump the fuel, containers located on an exterior of the flexible liquid fuel containment membrane and on opposite sides of the flexible liquid fuel containment membrane, and an operating system located inside one or more of the containers, the operating system comprising at least one selected from a power supply, a communication system, and a control processor; and
    transferring the fuel to a vertical takeoff and landing aircraft.

2. The method of claim 1, wherein the aircraft is hovering.

3. The method of claim 1, wherein the aircraft is landed on the flexible liquid fuel containment membrane.

4. The method of claim 1, further comprising changing a vertical position of the flexible liquid fuel containment membrane in the water body.

5. The method of claim 1, comprising submerging the flexible liquid fuel containment membrane in the water body prior to transferring the fuel to the aircraft; and
    surfacing the flexible liquid fuel containment membrane in the water body for the transferring the fuel to the aircraft.

6. The method of claim 1, wherein the operating system is a power supply.

7. The method of claim 1, wherein the operating system is a control processor.

8. The method of claim 1, wherein the resupply system further comprises a landing pad on a top surface of the flexible liquid fuel containment membrane; and
    the aircraft is landed on the landing pad while transferring the fuel to the aircraft.

9. The method of claim 1, wherein the resupply system further comprises a propulsion system on the flexible liquid fuel containment membrane.

10. The method of claim 1, wherein the resupply system further comprises a landing pad on a top surface of the flexible liquid fuel containment membrane; and
    a keel on a bottom surface of the flexible liquid fuel containment membrane.

11. A method for resupplying an aircraft at sea, the method comprising:

transferring fuel from an unmanned resupply system deployed in a water body to a vertical takeoff and landing aircraft, the resupply system comprising:
a flexible liquid fuel containment membrane containing the fuel;
a pump on the flexible liquid fuel containment membrane operable to pump the fuel to the aircraft;
containers located on an exterior of the flexible liquid fuel containment membrane and on opposite sides of the flexible liquid fuel containment membrane; and
an operating system located inside one or more of the containers, the operating system comprising at least one selected from a power supply, a communication system, and a control processor.

12. The method of claim 11, wherein the resupply system further comprises a landing pad on the flexible liquid fuel containment membrane.

13. The method of claim 11, wherein the resupply system further comprises a landing pad on the flexible liquid fuel containment membrane; and
the aircraft is landed on the landing pad while transferring the fuel to the aircraft.

14. The method of claim 11, wherein the resupply system further comprises a propulsion system on the flexible liquid fuel containment membrane.

15. The method of claim 11, wherein the resupply system further comprises a landing pad on a top surface of the flexible liquid fuel containment membrane; and
a keel on a bottom surface of the flexible liquid fuel containment membrane.

16. The method of claim 11, further comprising a boom configured to transfer non-pumped material from the flexible liquid fuel containment membrane to the aircraft.

17. The method of claim 11, wherein the flexible liquid fuel containment membrane includes a ballast system comprising a water chamber and an air chamber located inside of the flexible liquid fuel containment membrane.

18. The method of claim 11, further comprising submerging the flexible liquid fuel containment membrane in the water body prior to transferring the fuel to the aircraft;
surfacing the flexible liquid fuel containment membrane in the water body for the transferring the fuel to the aircraft; and
the resupply system further comprising a propulsion system on the flexible liquid fuel containment membrane.

19. The method of claim 18, wherein the resupply system further comprises a landing pad on the flexible liquid fuel containment membrane.

20. The method of claim 19, wherein the aircraft is landed on the landing pad.

* * * * *